United States Patent [19]

Ishiguro et al.

[11] Patent Number: 5,516,835
[45] Date of Patent: May 14, 1996

[54] ISOPRENE-BASED HYDROCARBON RESIN AND ADHESIVE COMPOSITION CONTAINING THE SAME

[75] Inventors: Minoru Ishiguro, Saitama; Haruo Yanasa, Kanagawa, both of Japan

[73] Assignee: Nippon Zeon Co., Ltd., Tokyo, Japan

[21] Appl. No.: 125,192

[22] Filed: Sep. 23, 1993

[30] Foreign Application Priority Data

Sep. 28, 1992 [JP] Japan ...................... 4-282545
Mar. 30, 1993 [JP] Japan ...................... 5-095521

[51] Int. Cl.[6] .................................... C08L 53/00
[52] U.S. Cl. ...................... 524/505; 524/502; 524/504
[58] Field of Search ...................... 524/505, 504, 524/502

[56] References Cited

U.S. PATENT DOCUMENTS

| | | | |
|---|---|---|---|
| 3,932,328 | 1/1976 | Korpman | 260/27 BB |
| 5,019,071 | 5/1991 | Bany et al. | 524/505 |
| 5,026,752 | 6/1991 | Wayakabashi et al. | 524/505 |
| 5,028,646 | 7/1991 | Miller et al. | 524/505 |

FOREIGN PATENT DOCUMENTS

| | | |
|---|---|---|
| 33060/89 | 4/1989 | Australia . |
| 63181/90 | 9/1990 | Australia . |
| 43-17979 | 7/1943 | Japan . |
| 60-104144 | 6/1985 | Japan . |
| 1-266175 | 10/1989 | Japan . |
| 2-86676 | 3/1990 | Japan . |
| 3-115483 | 5/1991 | Japan . |

Primary Examiner—Edward J. Cain
Attorney, Agent, or Firm—Birch, Stewart, Kolasch & Birch

[57] ABSTRACT

An isoprene-based hydrocarbon resin having a softening point of from 60° to 140° C. and a number average molecular weight of from 500 to 2000 which is obtained by cationic polymerization of a monomer mixture comprising from 40 to 90% by weight of isoprene and from 10 to 60% by weight of an aliphatic monoolefin containing 4 to 10 carbon atoms in the presence of a Friedel-Crafts catalyst and an adhesive composition comprising 100 parts by weight of a base polymer selected from the group consisting of an amorphous propylene polymer, a block copolymer rubber and isoprene rubber and from 10 to 200 parts by weight of said isoprene-based hydrocarbon resin as a tackifier are disclosed. The isoprene-based hydrocarbon resin is excellent in hue and heat stability to provide an adhesive composition excellent in heat stability.

19 Claims, No Drawings

ISOPRENE-BASED HYDROCARBON RESIN AND ADHESIVE COMPOSITION CONTAINING THE SAME

FIELD OF THE INVENTION

This invention relates to a novel isoprene-based hydrocarbon resin and an adhesive composition containing the same as a tackifier.

BACKGROUND OF THE INVENTION

Known tackifiers which are mixed with natural rubber, various block copolymer rubbers or ethylene copolymers, to provide adhesive compositions include hydrocarbon resins obtained by cationic polymerization of a monomer mixture mainly comprising a $C_5$ fraction. For these adhesive compositions to be used in a step involving heating, means for improving heat stability of the hydrocarbon resins have been proposed as disclosed, e.g., in JP-A-60-104144 (the term "JP-A" as used herein means an "unexamined published Japanese patent application"). However, the conventional hydrocarbon resin tackifiers for adhesive compositions are still unsatisfactory in hue stability.

In recent years, amorphous propylene polymers have found their use in hot-melt adhesives as suggested in JP-A-1-266175, Australian Patent application No. 33060/89 corresponding to JP-A-2-86676 and Australian Patent application No. 63181/90 corresponding to JP-A-3-115483. The hot-melt adhesives comprising amorphous propylene polymers usually contain, as a tackifier, an aliphatic petroleum resin, an aromatic petroleum resin, a terpene resin, rosin or its derivative, a hydrogenated aromatic petroleum resin, a hydrogenated terpene resin, a hydrogenated dicyclopentadiene resin, etc. However, the tolerance of these tackifiers is limited due to poor compatibility between the amorphous propylene polymer and the tackifiers. Further, when heated for a long time, the tackifier tends to separate from the amorphous propylene base polymer to form an oxidized skin which will clog the nozzles of a hot-melt coater. In some cases, a wax or a softener is incorporated into the hot-melt adhesives for the purpose of melt viscosity adjustment. However, since these additives considerably reduce the adhesive strength, the permissive amount of the additives to be incorporated is limited, posing difficulty in obtaining an adhesive well balanced between adhesive strength and melt viscosity.

SUMMARY OF THE INVENTION

An object of the present invention is to provide an isoprene-based hydrocarbon resin excellent in hue and heat stability as a tackifier for an adhesive composition.

Another object of the present invention is to provide an isoprene rubber-based adhesive composition which is excellent in heat stability.

A further object of the present invention is to provide a block copolymer rubber-based adhesive composition with excellent heat stability.

A still further object of the present invention is to provide an amorphous propylene polymer-based hot-melt adhesive composition excellent in hue and heat stability.

As a result of extensive investigations, the present inventors have found that a hydrocarbon resin obtained from a monomer mixture comprising isoprene and a specific aliphatic monoolefin has excellent heat stability. The present invention has been completed based on this finding.

The present invention thus provides a tackifier comprising an isoprene-based hydrocarbon resin having a softening point of from 60° to 140° C. and a number average molecular weight of from 500 to 2000 which is obtained by cationic polymerization of a monomer mixture comprising from 40 to 90% by weight of isoprene and from 10 to 60% by weight of an aliphatic monoolefin containing 4 to 10 carbon atoms in the presence of a Friedel-Crafts catalyst.

The present invention further provides an adhesive composition comprising 100 parts by weight of a base polymer selected from the group consisting of an amorphous propylene polymer, a block copolymer rubber and isoprene rubber and from 10 to 200 parts by weight of a tackifier comprising an isoprene-based hydrocarbon resin having a softening point of from 60° to 140° C. and a number average molecular weight of from 500 to 2000 which is obtained by cationic polymerization of a monomer mixture comprising from 40 to 90% by weight of isoprene and from 10 to 60% by weight of an aliphatic monoolefin containing 4 to 10 carbon atoms in the presence of a Friedel-Crafts catalyst.

DETAILED DESCRIPTION OF THE INVENTION

The tackifier according to the present invention is an isoprene-based hydrocarbon resin (hereinafter simply referred to as a hydrocarbon resin) having a softening point of from 60° to 140° C. and a number average molecular weight of from 500 to 2000 which is obtained by cationic polymerization of a monomer mixture comprising from 40 to 90% by weight of isoprene and from 10 to 60% by weight of an aliphatic monoolefin containing 4 to 10 carbon atoms in the presence of a Friedel-Crafts catalyst. The hydrocarbon resin is preferably a resin having a softening point of from 80° to 120° C. and a number average molecular weight of from 1000 to 1800 which is obtained by cationic polymerization of a monomer mixture comprising from 45 to 85% by weight of isoprene and from 20 to 55% by weight of an aliphatic monoolefin containing 4 to 10 carbon atoms in the presence of a Friedel-Crafts catalyst.

Use of isoprene in the monomer mixture for producing the hydrocarbon resin is essential in the present invention. It is difficult to obtain a hydrocarbon resin excellent in hue and heat stability with other conjugated diolefins, such as 1,3-pentadiene and 1,3-butadiene. If the isoprene proportion in the monomer mixture exceeds 90% by weight, the monomer mixture by-produces high-molecular weight polymers and, in some cases, solvent-insoluble gel polymers, which have poor compatibility with base polymers, especially an amorphous propylene polymer. If the isoprene proportion is less than 40% by weight, large quantities of low-molecular liquid polymers are by-produced, resulting in considerable reductions of the softening point of the resin and the yield of the resin.

The aliphatic monoolefins containing from 4 to 10 carbon atoms which can be used in the monomer mixture include isobutylene, butene-1, butene-2, 2-methyl-1-butene, 2-methyl-2-butene, pentene-1, pentene-2, cyclopentene, cyclohexene, and diisobutylene. Preferred of them are branched monoolefins, such as isobutylene, diisobutylene and 2-methyl-2-butene. A hydrocarbon resin obtained by copolymerization of such an aliphatic monoolefin and isoprene exhibits satisfactory compatibility with various base polymers. The hydrocarbon resin exhibits especially improved compatibility with an amorphous propylene polymer to provide a hot-melt adhesive composition with improved adhesive strength. If the proportion of the aliphatic monoolefin in the monomer mixture exceeds 60% by weight, low-molecular liquid polymers are by-produced in a large quantity, resulting in considerable reductions of the softening point of the resin and the yield of the resin.

As far as the effects of the present invention are not substantially impaired, the monomer mixture may further contain other polymerizable monomers, such as 1,3-butadiene, 1,3-pentadiene, cyclopentadiene, dicyclopentadiene, methylcyclopentadiene, indene, methylindene, styrene, α-methylstyrene, and vinyltoluene. The smaller the proportion of the other monomers, if used, the more preferred. Particularly preferably the upper limit amount of the other monomer which may be used is 3 wt %.

The hydrocarbon resin (particularly, the isoprene-based hydrocarbon resin) according to the present invention can be obtained by subjecting the above-mentioned monomer mixture to cationic polymerization in the presence of a Friedel-Crafts catalyst in a usual manner. Friedel-Crafts catalysts to be used include a halogenated aluminum catalyst, e.g., aluminum chloride or aluminum bromide (particularly preferably aluminum chloride), and a complex composed of an aluminum halide and a ligand, such as hydrogen chloride, a halogenated hydrocarbon or an aromatic hydrocarbon.

The hydrocarbon resin (particularly, the isoprene-based hydrocarbon resin) as a tackifier has a Gardner color of not more than 10 and a melt viscosity of not more than 1000 CPS at 200° C., and further the rate of change of initial melt viscosity of not more than 5% when heated at 180° C. for 72 hours.

The cationic polymerization is carried out usually in the absence of a solvent or, if desired, in the presence of an appropriate diluent. Usable diluents include aromatic hydrocarbons, aliphatic hydrocarbons, alicyclic hydrocarbons, and halogenated hydrocarbons, with aromatic hydrocarbons being preferred. The diluent is used in an amount usually of from 20 to 1000 parts by weight, and preferably of from 50 to 500 parts by weight, per 100 parts by weight of the monomer mixture. The reaction temperature ranges usually from 0° to 120° C. and preferably from 20° to 100° C. The reaction is usually conducted under atmospheric pressure or higher pressure and may also be effected under reduced pressure. The reaction time is usually from several seconds to 12 hours or, if desired, longer than that. After completion of the polymerization, the catalyst is removed from the reaction mixture in a usual manner, and any unreacted monomers, the diluent if used, and by-produced low-molecular liquid polymers are removed by such means as distillation under reduced pressure or steam distillation to thereby obtain a desired hydrocarbon resin (particularly, an isoprene-based hydrocarbon resin).

The isoprene rubber-based adhesive composition according to the present invention comprises isoprene rubber as a base polymer and the above-mentioned hydrocarbon resin (particularly, the isoprene-based hydrocarbon resin) as a tackifier. The compounding ratio of the hydrocarbon resin is subjected to variation depending on the end use but usually ranges from 10 to 200 parts by weight, and preferably from 20 to 150 parts by weight, per 100 parts by weight of isoprene rubber.

The isoprene rubber is a rubbery polymer of isoprene and typically includes high cis-1,4-polyisoprene obtained by solution polymerization of isoprene and natural rubber.

The isoprene rubber-based adhesive composition may be a solution prepared by a solvent process in which components are mixed by stirring in the presence of a solvent, such as toluene, or may be an emulsion prepared by mixing a rubber latex with a previously emulsified hydrocarbon resin by stirring. The resulting adhesive composition is usually applied to a prescribed substrate with a coater to produce an adhesive tape or an adhesive label.

The block copolymer rubber-based adhesive composition according to the present invention comprises a block copolymer rubber as a base polymer and the above-mentioned hydrocarbon resin as a tackifier. The compounding ratio of the hydrocarbon resin is subjected to variation depending on the end use but usually ranges from 10 to 200 parts by weight, and preferably from 20 to 150 parts by weight, per 100 parts by weight of the block copolymer rubber.

The block copolymer rubber which can be used in the present invention is a block copolymer obtained from an aromatic monoolefin and a conjugated diolefin. Any of such block copolymers generally employed as a base polymer in the field of adhesives may be used without particular restriction. Block copolymer rubbers represented by formula $(S-I)_n$, $(S-I)_n-S$ or $(S-I)_m-X$ are usually used, wherein S represents a block substantially comprising an aromatic monoolefin (e.g., styrene); I represents a block substantially comprising a conjugated diolefin (e.g., isoprene); X represents a coupling agent residue; n represents an integer of 1 to 10; and m represents an integer of 2 to 4. The terminology "substantially" as used above with respect to the polymer block S or I includes the case where block S and/or I contains a unit derived from the other copolymer component; the case where blocks I contain a small amount of the aromatic monoolefin in such a manner that the ratio of the aromatic monoolefin to the conjugated diolefin per block I gradually increases from one end to the other end (called a tapered block copolymer); and the case where at least part of block I is modified by hydrogenation. The block copolymer rubber to be used preferably has an aromatic monoolefin content of from 10 to 70% by weight, and preferably from 10 to 55% by weight, and a number average molecular weight of from 25,000 to 1,000,000, and preferably from 40,000 to 500,000.

Examples of the aromatic monoolefin constituting the block copolymer include styrene, α-methylstyrene, and vinyltoluene, with styrene being preferred. Examples of the conjugated diolefin include 1,3-butadiene, isoprene, and 1,3-pentadiene, with isoprene being preferred.

All the above-described block copolymers are known and can be prepared by a known process using a lithium initiator (see, for example, JP-B-43-17979, the term "JP-B" as used herein means an "examined published Japanese patent application").

The block copolymer rubber-based adhesive composition may be prepared by any arbitrary process, such as a hot-melt process in which the components are continuously mixed under heat in a melting vessel equipped with a stirrer or an extruder type kneading machine equipped with a single or twin screw, a solvent process in which the components are mixed with stirring in the presence of a solvent, such as toluene. The resulting adhesive composition is usually applied to a prescribed substrate with a coater to produce an adhesive tape or an adhesive label.

The hot-melt adhesive composition according to the present invention comprises an amorphous propylene polymer as a base polymer and the above-mentioned hydrocarbon resin (particularly the isoprene-based hydrocarbon resin) as a tackifier. The compounding ratio of the hydrocarbon resin is subjected to variation depending on the end use but usually ranges from 10 to 200 parts by weight, and preferably from 20 to 150 parts by weight, per 100 parts by weight of the amorphous propylene polymer. The hot-melt adhesive composition of the present invention is preferably used for adhesion to a polypropylene substrate.

The amorphous propylene polymer which can be used as a base polymer is an amorphous polymer having a propylene unit as a main repeating unit, including a random copolymer of propylene and up to 40% by weight of an α-olefin (e.g., ethylene or butene-1) as well as a propylene homopolymer. The amorphous propylene polymer preferably has a viscosity of from 200 to 20,000 cps, and more preferably from 400 to 10,000 cps, as measured at 190° C. in accordance with ASTM D3236, a ring and ball softening point of from 80° to 200° C., and more preferably from 100° to 180° C., as measured in accordance with ASTM E28, and a number average molecular weight of from 1000 to 20,000.

If the viscosity of the amorphous propylene polymer is less than 200 cps, the resulting hot-melt adhesive composition has insufficient cohesive strength. If it exceeds 20,000 cps, the composition is difficult to apply. If the softening point of the amorphous propylene polymer is less than 80° C., the composition has insufficient high temperature performances. If it exceeds 200° C., the low temperature performances are insufficient.

The above-mentioned amorphous propylene polymer can be prepared by polymerization of propylene alone or in combination with ethylene, butene-1, etc. in liquefied propylene in the presence of, for example a titanium catalyst supported on magnesium chloride and triethylaluminum in a hydrogen atmosphere. The polymer obtained by the above process is favorable as having a stable softening point and a stable melt viscosity within given ranges. If desired, low-molecular weight atactic polypropylene by-produced in the production of high-molecular weight isotactic polypropylene may be used in combination.

The hot-melt adhesive composition of the present invention is prepared by any arbitrary process. For example, the components are put in a melting vessel equipped with a stirrer, melt-kneaded at a temperature of 140° to 220° C., and then molded into a desired shape, such as blocks, pellets, rods, sheet, etc. The composition may be prepared continuously by means of a single or twin screw extruder.

The hot-melt adhesive composition has an initial Gardner color of not more than 2 and a Gardner color after being heated at 180° C. for 72 hours of 15 or less.

If desired, the adhesive compositions according to the present invention may contain polymers other than those described above and various compounding additives, such as tackifiers other than the hydrocarbon resin of the present invention, waxes, plasticizers, antioxidants, fillers, and so forth, as long as addition of these components gives no adverse influences on the effects of the present invention. Examples of useful other polymers or additives include ethylene-vinyl acetate copolymers and ethylene-ethyl acrylate copolymers; aliphatic petroleum resins, aromatic petroleum resins, polyterpene resins, rosin or derivatives thereof, hydrogenated aromatic petroleum resins, hydrogenated polyterpene resins and hydrogenated dicyclopentadiene resins as tackifiers; paraffin wax, microcrystalline wax, polyethylene wax, and Fischer-Tropsch wax; process oils, vegetable oils, and di-n-octyl phthalate and polybutene as plasticizers.

The upper limit amount of the above other polymers which may be used is preferably 10 parts by weight per 100 parts by weight of the base polymer and the upper limit amount of each the above additives which may be used is preferably 50parts by weight per 100 parts by weight of the base polymer.

The present invention will now be illustrated in greater detail with reference to Examples, but the present invention should not be construed as being limited thereto. All the parts and percents are by weight unless otherwise indicated.

EXAMPLES 1 TO 5 AND COMPARATIVE EXAMPLES 1 TO 5

In a 5 l glass flask were put 100 parts of benzene and 1 part of aluminum chloride of about 40 mesh. To the mixture was added continuously and slowly 100 parts of a monomer mixture shown in Table 1 below over 90 minutes and polymerized at 65° C. After completion of the polymerization, the reaction mixture was worked up in a usual manner to obtain an isoprene-based hydrocarbon resin. The resins obtained in Examples 1 to 5 will hereinafter be designated resins A to E, and those obtained in Comparative Examples 1 to 5 will be designated resins F to I. The physical properties of the resulting hydrocarbon resins A to I and, for comparison, a commercially available hydrogenated hydrocarbon resin ("J: Escorez 5300" produced by Tonex Corp.) (hereinafter designated resin J) were measured as follows. The results obtained are shown in Table 1.

1) Average Molecular Weight:

The weight average molecular weight (Mw) and number average molecular weight (Mn) were measured by gel-permeation chromatography and expressed as being reduced to polystyrene.

2) Gardner Color

The Gardner color of the initial stage was measured in accordance with JIS K-5400 immediately after a 50% toluene solution of the hydrocarbon resin was prepared.

Also, the Gardner color after heating was measured in accordance with JIS K-5400 using a 50% toluene solution of the hydrocarbon resin prepared after the hydrocarbon resin was heated at 180° C. for 72 hours.

3) Melt Viscosity (cps):

The melt viscosity of the hydrocarbon resin immediately after being prepared and after being heated at 180° C. for 72 hours was measured at 200° C. by means of a Brookfield viscometer equipped with a thermo-container.

TABLE 1

| | Hydrocarbon Resins of Examples 1 to 5 | | | | | Hydrocarbon Resins of Comparative Examples 1 to 6 | | | | |
| --- | --- | --- | --- | --- | --- | --- | --- | --- | --- | --- |
| | A | B | C | D | E | F | G | H | I | J |
| Monomer Mixture (%): | | | | | | | | | | |
| Isoprene | 70 | 60 | 50 | 65 | 55 | 95 | 30 | 50 | — | Escorez 5300 |
| 1,3-Pentadiene | — | — | — | — | — | — | — | — | 53 | |
| 2-Methyl-2-butene | 30 | 40 | 50 | — | — | 5 | 70 | — | — | |

TABLE 1-continued

|  | Hydrocarbon Resins of Examples 1 to 5 | | | | | Hydrocarbon Resins of Comparative Examples 1 to 6 | | | | |
| --- | --- | --- | --- | --- | --- | --- | --- | --- | --- | --- |
|  | A | B | C | D | E | F | G | H | I | J |
| Isobutylene | — | — | — | 35 | — | — | — | — | — | |
| Diisobutylene | — | — | — | — | 45 | — | — | 10 | 25 | |
| Cyclopentene | — | — | — | — | — | — | — | — | 15 | |
| Styrene | — | — | — | — | — | — | — | 40 | — | |
| Other $C_5$ olefins | — | — | — | — | — | — | — | — | 7 | |
| Yield of Resin (%) | 93 | 84 | 72 | 91 | 78 | 83 | 54 | 89 | 82 | — |
| Softening Point (°C.) | 115 | 97 | 88 | 94 | 95 | 133 | 35 | 105 | 96 | 105 |
| Mw/Mn | 4150/ | 2170/ | 1910/ | 2410/ | 2440/ | 12770/ | 1230/ | 2220/ | 2690/ | 640/ |
|  | 1660 | 1290 | 1060 | 1310 | 1260 | 2280 | 780 | 1160 | 1240 | 340 |
| Gardner Color |  |  |  |  |  |  |  |  |  |  |
| Initial | 1 | 1 | 2 | 1 | 2 | 1 | 3 | 3 | 4 | less than 1 |
| After heating | 7 | 7 | 8 | 7 | 8 | 7 | 11 | 10 | 14 | 9 |
| Melt Viscosity: |  |  |  |  |  |  |  |  |  |  |
| Initial | 316 | 130 | 79 | 100 | 98 | 3450 | 18 | 192 | 165 | 120 |
| After heating | 318 | 129 | 81 | 100 | 98 | 3510 | 26 | 193 | 182 | 172 |

The results in Table 1 prove that any of the hydrocarbon resins A to E according to the present invention exhibits excellent hue and undergoes no or little change in melt viscosity on being heated. The change of resins A to E in hue on heating is slight.

To the contrary, resin F containing less than 10% of an aliphatic monoolefin has a high Mw and a considerably high melt viscosity and is therefore of no use as a tackifier for a hot-melt adhesive composition. Resin G containing more than 60% of an aliphatic monoolefin has a very low softening point. Resin H containing an aromatic monoolefin is inferior in hue. Resin I using 1,3-pentadiene as a conjugated diolefin is inferior in hue and, upon being heated, undergoes a great change in hue and a great increase in melt viscosity. Further, resin J, a hydrogenated hydrocarbon resin, suffers from a considerable hue change and a great increase in melt viscosity on being heated.

EXAMPLES 6 TO 10 AND COMPARATIVE EXAMPLES 6 TO 8

A hundred parts of natural rubber (pale crepe; Mooney viscosity: 60), 100 parts of each of resins A to G and I, and 1 part of an antioxidant were dissolved in toluene to prepare an adhesive solution having a nonvolatile content of 40%. The solution was coated on a 25 µm thick polyester film to a thickness of 25 µm to prepare an adhesive tape. The tackiness (according to J. Dow method), peel adhesion in the initial stage and after accelerated aging, and holding power of the resulting adhesive tape were measured according to the following methods. Further, the state of failure in the peel test after accelerated aging (70° C.×3 days) was observed.

1) Tackiness (in the initial stage):

The method of JIS Z-0237 was applied. The adhesive tape of 10 cm long was fixed on a stainless steel plate set at an incline of 30° with the adhesive layer up. A set of 30 steel balls having a diameter varying from 3/32 inch to 1 inch, numbered from 1 to 30 in increasing order of size, were successively rolled on the adhesive layer from the higher end thereof at an initial speed of 0. The test was conducted at 23° C. The tackiness of the adhesive tape was expressed by the size (ball number) of the biggest of the balls which stopped on the adhesive layer.

2) Peel Adhesion:

The method of JIS Z-0237 was applied. The adhesive tape of 10 mm wide and 100 mm long was adhered to a stainless steel plate having been polished with No. 280 water-resistant sandpaper and peeled at a peel angle of 180° at a peel rate of 200 mm/min at 23° C. to obtain a peel adhesion (g/cm). Further, the adhesive tape was aged at 70° C. for 3 days, and the peel adhesion was measured in the same manner.

3) Holding Power:

In accordance with JIS Z-0237, the adhesive tape was adhered to the same stainless steel as used in the above peel adhesion test with an adhesion area of 10 mm× 10 mm. A load of 1 kg was attached to the free end of the adhesive tape at 40° C., and the time (min) required for the adhesive tape to peel off the stainless steel plate was measured.

The results of these measurements are shown in Table 2 below.

TABLE 2

|  | Example 6 | Example 7 | Example 8 | Example 9 | Example 10 | Compar. Example 6 | Compar. Example 7 | Compar. Example 8 |
| --- | --- | --- | --- | --- | --- | --- | --- | --- |
| Hydrocarbon Resin | A | B | C | D | E | F | G | I |
| Tackiness (ball number) | 5 | 17 | 22 | 18 | 16 | less than 3 | 28 | 16 |
| Holding Power (min) | 150 | 53 | 23 | 46 | 50 | 980 | 4 | 45 |
| Peel Adhesion (g/cm): |  |  |  |  |  |  |  |  |
| Initial | 560 | 420 | 340 | 370 | 380 | 500 | 180 | 380 |

TABLE 2-continued

|  | Example 6 | Example 7 | Example 8 | Example 9 | Example 10 | Compar. Example 6 | Compar. Example 7 | Compar. Example 8 |
|---|---|---|---|---|---|---|---|---|
| After Accelerated Aging | 610 | 450 | 370 | 410 | 410 | 610 | 190 | 660 |
| State of Failure After Accelerated Aging | adhesive failure | adhesive failure | adhesive failure | adhesive failure | adhesive failure | adhesive failure | adhesive failure | cohesive failure |

It is clearly seen from the results of Table 2 that the isoprene rubber-based adhesive compositions according to the present invention show small change in peel adhesion when acceleratedly aged and exhibit well-balanced adhesive properties between tackiness, peel adhesion, and holding power as compared with the comparative compositions. The adhesive composition using resin I, which comprised 1,3-pentadiene as a conjugated diolefin, underwent a great change in peel adhesion by the accelerated aging and also suffered a cohesive failure in the peel test after the accelerated aging.

EXAMPLES 11 TO 15 AND COMPARATIVE EXAMPLES 9 TO 11

A hundred parts of a styrene-isoprene block copolymer ("Quintac 3421" produced by Nippon Zeon Co., Ltd.), 100 parts of each of resins A to G and I, 20 parts of a naphthenic process oil ("Shellflex 371" produced by Shell Chemical Corp.), and 1 part of an antioxidant were dissolved in toluene to prepare an adhesive solution having a nonvolatile content of 40%. The solution was coated-on a 25 μm thick polyester film to a thickness of 25 μm to prepare an adhesive tape. The resulting adhesive tape was evaluated in the same manner as in Example 6. The results obtained are shown in Table 3 below.

change in peel strength by the accelerated aging and suffered a cohesive failure in the peel test after the accelerated aging.

EXAMPLES 16 TO 23 AND COMPARATIVE EXAMPLES 12 TO 15

An amorphous propylene polymer selected from "Ubetac 2180", produced by Ube Rexene Co., Ltd., [viscosity (190° C.): 8000 cps; softening point: 157° C.] and "Ubetac 2280", produced by Ube Rexene Co., Ltd, [viscosity (190° C.): 8000 cps; softening point: 146° C.] and a hydrocarbon resin selected from resins A to E and H to J or, for further comparison, a commercially available aliphatic petroleum resin ("Quintone R100" produced by Nippon Zeon Co., Ltd.; softening point: 96° C., Gardner color: 4) were mixed at 180° C. at a ratio shown in Table 4 below to prepare a hot-melt adhesive composition. The melt viscosity and heat stability of the resulting compositions were measured as follows. The results obtained are shown in Table 4.
1) Melt Viscosity:
  Measured at 180° C. by means of a Brookfield viscometer equipped with a thermo-container.
2) Heat Stability:
  Thirty grams of the hot-melt adhesive composition was put in a 50 ml beaker. The beaker and the contents were allowed to stand in an oven set at 180° C. After a prescribed

TABLE 2

|  | Example 11 | Example 12 | Example 13 | Example 14 | Example 15 | Compar. Example 9 | Compar. Example 10 | Compar. Example 11 |
|---|---|---|---|---|---|---|---|---|
| Hydrocarbon Resin | A | B | C | D | E | F | G | I |
| Tackiness (ball number) | 4 | 15 | 20 | 16 | 14 | less than 3 | 25 | 15 |
| Holding power (min) | 2000 | 1230 | 650 | 960 | 1180 | * | 120 | 840 |
| Peel Adhesion (g/cm): |  |  |  |  |  |  |  |  |
| Initial | 680 | 510 | 460 | 480 | 530 | * | 230 | 480 |
| After Accelerated Aging | 730 | 550 | 480 | 510 | 570 | * | 250 | 920 |
| State of Failure After Accelerated Aging | adhesive failure | adhesive failure | adhesive failure | adhesive failure | adhesive failure | * | adhesive failure | cohesive failure |

Note:
*The adhesive tape did not adhere.

As is apparent from the results in Table 3, the block copolymer rubber-based adhesive compositions according to the present invention show a small change in peel adhesion by the accelerated aging and exhibit well-balanced adhesive properties between tackiness, peel adhesion, and holding power as compared with the comparative compositions. The adhesive composition using resin I (comprising 1,3-pentadiene as a conjugated diolefin) underwent a great time, the surface of the composition was observed to obtain an area ratio of an oxidized skin formed. At the same time, the hue of the composition was evaluated with a Gardner color in accordance with JIS K5400.

Then, the hot-melt adhesive composition was heated to 180° C. and coated on a 50 μm thick polypropylene film to a thickness of 50 μm to prepare an adhesive tape. The tackiness of the adhesive tape was measured as follows.

3) Peel Adhesion:

The adhesive tape was slit to a strip of 25 mm wide and adhered to a polypropylene plate of 30 mm wide and 4 mm thick by pressure application at 140° C. for 2 seconds. The strip was then peeled at a peel angle of 180° and at a peel rate of 200 mm/min by means of a tensile tester to obtain a peel adhesion (g/25 mm).

The results of these measurements are shown in Table 4.

TABLE 4

| | Example No. | | | | | | | | Comparative Example No. | | | |
|---|---|---|---|---|---|---|---|---|---|---|---|---|
| | 16 | 17 | 18 | 19 | 20 | 21 | 22 | 23 | 12 | 13 | 14 | 15 |
| Composition (parts): | | | | | | | | | | | | |
| Ubetac 2180 | 100 | 100 | 100 | 100 | 100 | 100 | 100 | — | 100 | 100 | 100 | 100 |
| Ubetac 2280 | — | — | — | — | — | — | — | 100 | — | — | — | — |
| Resin A | 100 | — | — | — | — | — | — | — | — | — | — | — |
| Resin B | — | 100 | — | — | — | 80 | 120 | 100 | — | — | — | — |
| Resin C | — | — | 100 | — | — | — | — | — | — | — | — | — |
| Resin D | — | — | — | 100 | — | — | — | — | — | — | — | — |
| Resin E | — | — | — | — | 100 | — | — | — | — | — | — | — |
| Resin H | — | — | — | — | — | — | — | — | 100 | — | — | — |
| Resin I | — | — | — | — | — | — | — | — | — | 100 | — | — |
| Resin J (Escorez 5300) | — | — | — | — | — | — | — | — | — | — | 100 | — |
| Quintone R100 | — | — | — | — | — | — | — | — | — | — | — | 100 |
| Melt Viscosity (cps) | 2450 | 1960 | 1450 | 1920 | 2060 | 2650 | 1460 | 2050 | 2460 | 2320 | 2850 | 2410 |
| Peel Adhesion (g/25 mm) | 3900 | 5400 | 5800 | 5200 | 4500 | 5000 | 5200 | 3800 | 500 | 3200 | 900 | 3300 |
| Heat Stability: | | | | | | | | | | | | |
| Area ratio of oxidized skin (%): | | | | | | | | | | | | |
| Initial | 0 | 0 | 0 | 0 | 0 | 0 | 0 | 0 | 0 | 0 | 0 | 0 |
| After 24 hrs | 0 | 0 | 0 | 0 | 0 | 0 | 0 | 0 | 0 | 0 | 25 | 0 |
| After 48 hrs | 0 | 0 | 0 | 0 | 0 | 0 | 0 | 0 | 0 | 25 | 75 | 25 |
| After 72 hrs | 0 | 0 | 0 | 0 | 0 | 0 | 0 | 0 | 25 | 50 | 100 | 50 |
| Gardner color | | | | | | | | | | | | |
| Initial | 2 | 2 | 2 | 2 | 2 | 2 | 2 | 2 | 4 | 7 | 1 | 7 |
| After 24 hrs | 7 | 6 | 8 | 7 | 8 | 6 | 6 | 6 | 10 | 13 | 10 | 13 |
| After 48 hrs | 11 | 10 | 12 | 11 | 12 | 9 | 10 | 10 | 13 | 16 | 14 | 16 |
| After 72 hrs | 13 | 12 | 14 | 13 | 14 | 11 | 12 | 12 | 15 | more than 18 | 16 | more than 18 |

As is apparent from the result of Table 4, the hot-melt adhesive compositions according to the present invention have excellent peel adhesion to a polypropylene substrate, form no oxidative skin on the surface when heated for a long time, and undergo a reduced change in hue on being heated. To the contrary, the composition containing an aromatic monoolefin-containing hydrocarbon resin (resin H) fails to show sufficient peel adhesion. The composition containing resin I using 1,3-pentadiene as a conjugated diolefin as a comonomer is inferior in hue, undergoes a serious change in hue on being heated, and forms an oxidative film when heated for a long time. The composition containing a hydrogenated hydrocarbon resin (resin J) or a commercially available aliphatic petroleum resin (Quintone R100), though in excellent in initial-hue, undergoes a great change in hue on being heated, forms an oxidative skin soon, and has insufficient peel adhesion.

The present invention thus provides an isoprene-based hydrocarbon resin excellent in hue and heat stability. The isoprene-based hydrocarbon resin of the present invention serves as a tackifier for various base polymers to provide adhesive composition with excellent heat stability, such as an isoprene rubber-based adhesive composition, a block copolymer rubber-based adhesive composition, and an amorphous propylene copolymer-based hot-melt adhesive composition.

While the invention has been described in detail and with reference to specific examples thereof, it will be apparent to one skilled in the art that various changes and modifications can be made therein without departing from the spirit and scope thereof.

What is claimed is:

1. A tackifier comprising an isoprene-based hydrocarbon resin having a softening point of from 60° to 140° C. and a number average molecular weight of from 500 to 2000 which is obtained by cationic-polymerizing a monomer mixture consisting of from 40 to 90% by weight of isoprene and from 10 to 60% by weight of an aliphatic monoolefin containing 4 to 10 carbon atoms in the presence of a Friedel-Crafts catalyst.

2. The tackifier as claimed in claim 1, wherein said isoprene-based hydrocarbon resin has a softening point of from 80° to 120° C. and a number average molecular weight of from 1000 to 1800 and is obtained by cationic-polymerizing a monomer mixture consisting of from 45 to 85% by weight of isoprene and from 20 to 55% by weight of an aliphatic monoolefin containing 4 to 10 carbon atoms in the presence of a Friedel-Crafts catalyst.

3. The tackifier as claimed in claim 1, wherein said aliphatic monoolefin is a branched monoolefin.

4. The tackifier as claimed in claim 1, wherein said aliphatic monoolefin is selected from the group consisting of isobutylene, diisobutylene and 2-methyl-2-butene.

5. The tackifier as claimed in claim 1, wherein said Friedel-Crafts catalyst is a halogenated aluminum catalyst.

6. The tackifier as claimed in claim 1, wherein said isoprene-based hydrocarbon resin has a Gardner color after heating at 180° C. for 72 hours of not more than 10 and a melt viscosity of not more than 1000 cps as measured at 200° C., with the rate of change of initial melt viscosity when heated at 180° C. for 72 hours being not more than 5%.

7. An adhesive composition comprising 100 parts by weight of a base polymer and from 10 to 200 parts by weight of a tackifier comprising an isoprene-based hydrocarbon resin having a softening point of from 60° to 140° C. and a number average molecular weight of from 500 to 2000 which is obtained by cationic-polymerizing a monomer mixture consisting of from 40 to 90% by weight of isoprene and from 10 to 60% by weight of an aliphatic monoolefin containing 4 to 10 carbon atoms in the presence of a Friedel-Crafts catalyst.

8. The adhesive composition as claimed in claim 7, wherein said base polymer is selected from the group consisting of an amorphous propylene polymer, a block copolymer rubber and isoprene rubber.

9. The adhesive composition as claimed in claim 7, wherein said base polymer is an amorphous propylene polymer.

10. The adhesive composition as claimed in claim 7, wherein said composition is a hot-melt adhesive composition comprising an amorphous propylene polymer as a base polymer.

11. The adhesive composition as claimed in claim 10, wherein said amorphous propylene polymer has a viscosity of from 200 to 20,000 cps as measured at 190° C., a ring and ball softening point of from 80° to 200° C., and a number average molecular weight of from 1000 to 20,000.

12. The adhesive composition as claimed in claim 10, wherein said amorphous propylene polymer has a viscosity of from 400 to 10,000 cps as measured at 190° C., a ring and ball softening point of from 100° to 180° C., and a number average molecular weight of from 1000 to 20,000 and said isoprene-based hydrocarbon resin has a softening point of from 80° to 120° C. and a number average molecular weight of from 1000 to 1800 and is obtained by cationic-polymerizing a monomer mixture, consisting of from 45 to 85% by weight of isoprene and from 20 to 55% by weight of an aliphatic monoolefin containing 4 to 10 carbon atoms in the presence of a Friedel-Crafts catalyst.

13. The adhesive composition as claimed in claim 10, wherein said hot-melt adhesive composition is for adhesion to a polypropylene substrate.

14. The adhesive composition as claimed in claim 13, wherein said hot-melt adhesive composition has an initial Gardner color of not more than 2 and does not increase in Gardner color over 15 after being heated at 180° C. for 72 hours.

15. The adhesive composition as claimed in claim 7, wherein said base polymer is a block copolymer rubber.

16. The adhesive composition as claimed in claim 15, wherein said block copolymer rubber is an aromatic monoolefin/conjugated diene block copolymer having an aromatic monoolefin content of from 10 to 70% by weight and a number average molecular weight of from 25,000 to 1,000,000.

17. The adhesive composition as claimed in claim 15, wherein said block copolymer rubber is a styrene/isoprene block copolymer having a styrene content of from 10 to 55% by weight and a number average molecular weight of from 4,000 to 500,000.

18. The adhesive composition as claimed in claim 7, wherein said base polymer is isoprene rubber.

19. The adhesive composition as claimed in claim 18, wherein said isoprene rubber is natural rubber.

* * * * *